US011228451B2

(12) United States Patent
Robert et al.

(10) Patent No.: US 11,228,451 B2
(45) Date of Patent: Jan. 18, 2022

(54) AUTHENTICATED CONTENT DELIVERY PLATFORM

(71) Applicant: Disney Enterprises, Inc., Burbank, CA (US)

(72) Inventors: Arnaud Robert, Simi Valley, CA (US); Gregory Thomas Brandeau, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 622 days.

(21) Appl. No.: 15/217,781

(22) Filed: Jul. 22, 2016

(65) Prior Publication Data
US 2016/0337134 A1 Nov. 17, 2016

Related U.S. Application Data

(63) Continuation-in-part of application No. 13/086,342, filed on Apr. 13, 2011, now abandoned.

(51) Int. Cl.
*H04L 9/32* (2006.01)
*G06Q 30/02* (2012.01)

(52) U.S. Cl.
CPC ....... *H04L 9/3268* (2013.01); *G06Q 30/0257* (2013.01); *H04L 2209/60* (2013.01)

(58) Field of Classification Search
CPC .............. G06Q 30/0257; H04L 9/3268; H04L 2209/60
See application file for complete search history.

(56) References Cited

U.S. PATENT DOCUMENTS

| 2005/0187823 | A1* | 8/2005 | Howes ................. G06Q 30/02 705/14.58 |
| 2006/0059227 | A1 | 3/2006 | Zimler et al. |
| 2008/0046930 | A1* | 2/2008 | Smith .................. H04N 7/163 725/46 |

(Continued)

FOREIGN PATENT DOCUMENTS

WO 2012142167 A2 10/2012

OTHER PUBLICATIONS

U.S. Appl. No. 13/086,342, "Final Office Action", dated Jul. 16, 2013, 19 pages.

(Continued)

*Primary Examiner* — David J Stoltenberg
*Assistant Examiner* — Michael J Cross
(74) *Attorney, Agent, or Firm* — Kilpatrick Townsend & Stockton LLP

(57) ABSTRACT

Methods and systems for authenticated supplemental content delivery are disclosed herein. The systems can include a first requestor and a second requestor. The system can include a plurality of networked servers. The plurality of networked servers can: receive a first supplemental content request including a digital certificate from the first requestor; determine the inclusion of the digital certificate in the first supplemental content request; validate the digital certificate; determine a supplemental content class from a set of supplemental content classes based on the digital certificate; select first supplemental content based on: the determined supplemental content class; and provide the selected first supplemental content in an electronic form to the first requestor.

26 Claims, 7 Drawing Sheets

(56) References Cited

U.S. PATENT DOCUMENTS

| | | | |
|---|---|---|---|
| 2010/0042470 A1* | 2/2010 | Chang | G06Q 30/0241 |
| | | | 705/14.64 |
| 2010/0125523 A1* | 5/2010 | Solomon | G06Q 10/10 |
| | | | 705/51 |
| 2010/0174652 A1* | 7/2010 | Shear | G11B 20/0071 |
| | | | 705/53 |
| 2010/0262498 A1* | 10/2010 | Nolet | G06Q 30/0276 |
| | | | 705/14.71 |
| 2010/0293049 A1 | 11/2010 | Maher et al. | |
| 2010/0293058 A1 | 11/2010 | Maher et al. | |
| 2012/0265609 A1 | 10/2012 | Robert et al. | |

OTHER PUBLICATIONS

U.S. Appl. No. 13/086,342, "Final Office Action", dated May 18, 2015, 23 pages.
U.S. Appl. No. 13/086,342, "Non-Final Office Action", dated Sep. 23, 2014, 22 pages.
U.S. Appl. No. 13/086,342, "Non-Final Office Action", dated Feb. 14, 2014, 22 pages.
U.S. Appl. No. 13/086,342, "Non-Final Office Action", dated Mar. 24, 2016, 25 pages.
U.S. Appl. No. 13/086,342, "Non-Final Office Action", dated Jan. 8, 2013, 21 pages.
PCT/US2012/33132, "International Search Report and Written Opinion", dated Aug. 31, 2012, 16 pages.

* cited by examiner

AUTHENTICATED CONTENT DELIVERY PLATFORM

CROSS-REFERENCE TO RELATED APPLICATIONS

This application is a continuation-in part of U.S. application Ser. No. 13/086,342, filed on Apr. 13, 2011, and entitled AUTHENTICATED ADVERTISEMENT PLATFORM, the entirety of which is incorporated by reference herein.

BACKGROUND

This application relates to the field of data transmission.

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e., work using) other more specific or more general communications protocols, except for the physical layer that directly deals with the transmission media.

BRIEF SUMMARY

One aspect of the present disclosure relates to a method for distributing supplemental content over a network to which computer devices can connect. The method includes receiving a first supplemental content request including a digital certificate from a first requestor via a communication subsystem connecting to an application programming interface of a supplemental content platform server via a web server. In some embodiments, the first requestor can be a computing device that presents content and supplemental content to viewers. The method can include identifying by the supplemental content platform server the digital certificate in the first supplemental content request; determining, at the supplemental content platform server, the validity of the digital certificate indicating that the first requestor is a legitimate requestor based on the determined inclusion of the digital certificate in the first supplemental content request; and determining a supplemental content class from a set of supplemental content classes based on the digital certificate for the first requestor. In some embodiments, each of the set of supplemental content classes is associated with a plurality of requestors, and the first requestor is associated with the determined supplemental content class. The method can include selecting, by the supplemental content platform server, a first supplemental content based on: the determined supplemental content class, the determined inclusion of the digital certificate in the first supplemental content request, and the determined validity of the digital certificate. In some embodiments, the selected supplemental content is preapproved for the supplemental content class, and the selected supplemental content is preapproved for the legitimate requestor. The method can include retrieving the selected first supplemental content from a data storage device; and providing the selected first supplemental content in an electronic form to the first requestor via the application platform interface. The method can include receiving a second supplemental content request excluding a digital certificate from a second requestor via the application programming interface of the supplemental content platform server. In some embodiments, the second requestor can be a second computing device that presents content and supplemental content to viewers. The method can include determining the absence of the digital certificate in the second supplemental content request; and selecting, by supplemental content platform server, second supplemental content based on the determined absence of the digital certificate in the second supplemental content. In some embodiments, the second supplemental content is selected from a set of default supplemental contents, and the default supplemental contents are unrestricted. The method can include providing the selected second supplemental content in an electronic form to the second requestor.

In some embodiments, the method can include receiving metadata associated with at least one of the first and second supplemental contents. In some embodiments, the selecting is further based on the received metadata. In some embodiments, the metadata includes supplemental content class information. In some embodiments, the method includes receiving supplemental content data from a supplemental content provider server. In some embodiments, the supplemental content data includes at least one piece of supplemental content and metadata associated with the at least one piece of supplemental content. In some embodiments, the selecting is further based on the metadata associated with the at least one piece of supplemental content.

In some embodiments, the supplemental content provider server is associated with a supplemental content provider. In some embodiments, the metadata includes digital certificate criteria information. In some embodiments, the supplemental content in the set of default supplemental content is flagged as not requiring a digital certificate to be included in a supplemental content request. In some embodiments, determining the supplemental content class includes identifying the supplemental content class based on information provided by the digital certificate.

In some embodiments, determining the supplemental content class includes: determining a certificate type for the digital certificate; and identifying the supplemental content class based on the certificate type. In some embodiments, determining the supplemental content class includes identifying the supplemental content class based on classification information provided by the digital certificate. In some embodiments, an at least one class in the set of supplemental content classes is based on a Motion Picture Association of America movies ratings system. In some embodiments, the selecting further includes selecting based on information about a website with which the digital certificate is associated. In some embodiments, the digital certificate is formatted according to an X.509 standard.

One aspect of the present disclosure relates to a system for authenticated supplemental content delivery. The system includes a first requestor including a computing device that presents content and supplemental content to viewers via a display subsystem. The system includes a second requestor including a computing device that presents content and supplemental content to viewers via a display subsystem. The system includes a plurality of networked servers. The plurality of networked servers can: receive a first supplemental content request including a digital certificate from the first requestor; determine the inclusion of the digital certificate in the first supplemental content request; validate the digital certificate indicating that the first requestor is a legitimate requestor based on the determined inclusion of the digital certificate in the first supplemental content request; and determine a supplemental content class from a set of supplemental content classes based on the digital certificate for the first requestor. In some embodiments, each of the set of supplemental content classes is associated with a plurality of requestors, and the first requestor is associated with the determined supplemental content class. The plurality of networked servers can select first supplemental content based on: the determined supplemental content class, the determined inclusion of the digital certificate in the first supplemental content request, and the determined validity of the digital certificate. In some embodiments, the selected supplemental content is preapproved for the supplemental content class, and the selected supplemental content is preapproved for the legitimate requestor. The plurality of networked servers can: provide the selected first supplemental content in an electronic form to the first requestor; receive a second supplemental content request excluding a digital certificate from the second requestor; determine the absence of the digital certificate in the second supplemental content request; and select second supplemental content based on the determined absence of the digital certificate in the second supplemental content. In some embodiments, the second supplemental content is selected from a set of default supplemental contents, and the set of default supplemental contents is unrestricted. The plurality of networked servers can provide the selected second supplemental content in an electronic form to the second requestor.

In some embodiments, the plurality of networked servers can receive metadata associated with at least one of the first supplemental content and the second supplemental content. In some embodiments, the selecting is further based on the received metadata. In some embodiments, the metadata includes supplemental content class information. In some embodiments, the plurality of networked servers can receive supplemental content data from a supplemental content provider server. In some embodiments, the supplemental content data includes at least one piece of supplemental content and metadata associated with the at least one piece of supplemental content, and in some embodiments, the selecting is further based on the metadata associated with the at least one piece of supplemental content.

In some embodiments, the supplemental content provider server is associated with a supplemental content provider. In some embodiments, the metadata includes digital certificate criteria information. In some embodiments, supplemental content in the set of default supplemental content is flagged as not requiring a digital certificate to be included in a supplemental content request. In some embodiments, determining the supplemental content class includes identifying the supplemental content class based on information provided by the digital certificate.

In some embodiments, determining the supplemental content class includes: determining a certificate type for the digital certificate; and identifying the supplemental content class based on the certificate type. In some embodiments, determining the supplemental content class includes identifying the supplemental content class based on classification information provided by the digital certificate. In some embodiments, an at least one class in the set of supplemental content classes is based on a Motion Picture Association of America movies ratings system. In some embodiments, the selecting further includes selecting based on information about a website with which the digital certificate is associated. In some embodiments, the digital certificate is formatted according to an X.509 standard.

DETAILED DESCRIPTION OF THE INVENTION

Figure 1:
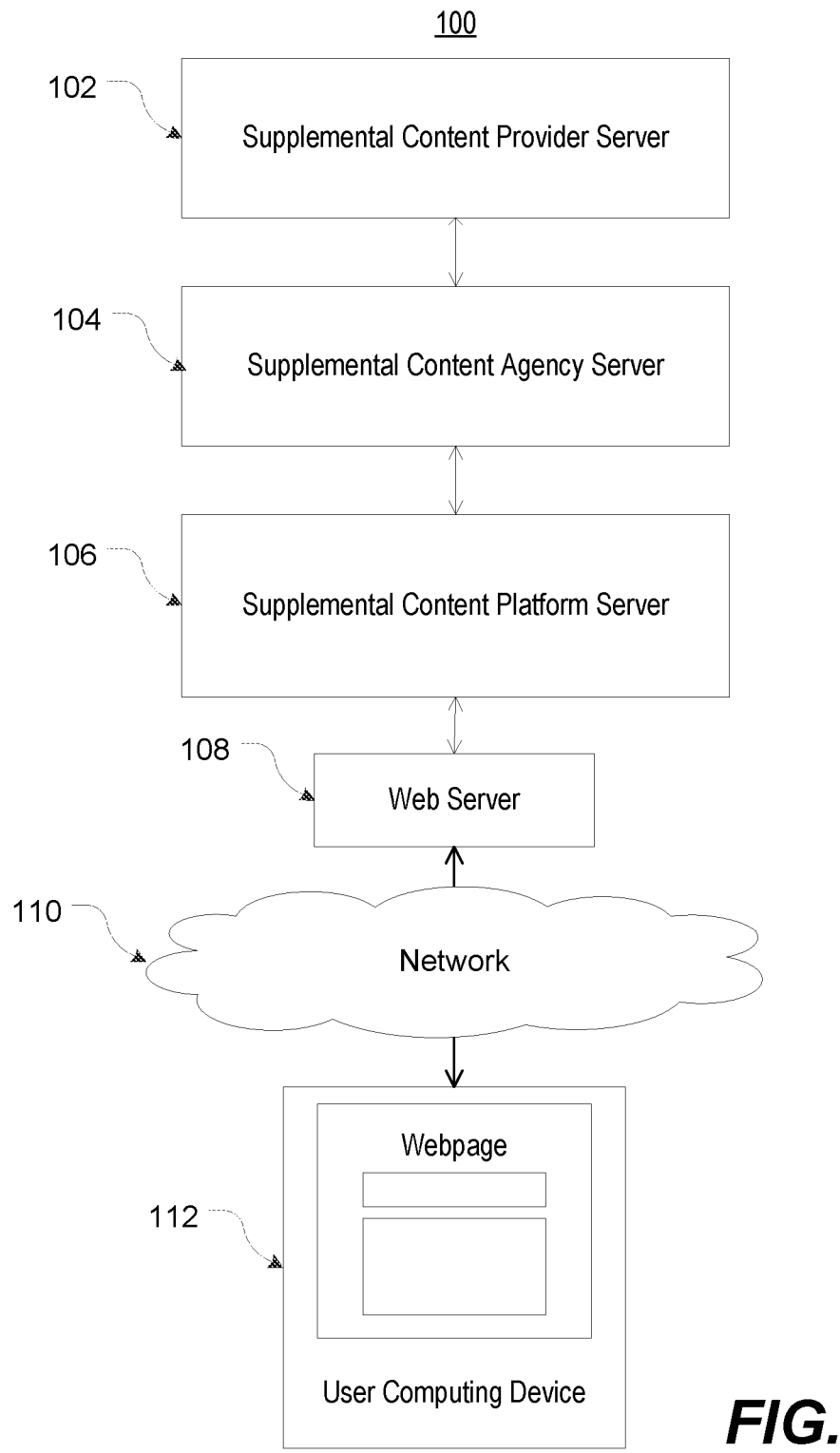
FIG. 1 is a block diagram of a supplemental content distribution system according to one embodiment of the present invention.

In the following description, for the purposes of explanation, numerous specific details are set forth in order to provide a thorough understanding of the present invention. It will be apparent, however, to one skilled in the art that the present invention may be practiced without some of these specific details.

The present disclosure describes methods and systems for distributing online content, and specifically for distributing online supplemental content, based on a digital certificate received by a content platform server. In one embodiment, a user having a computer with a browser uses the browser to request content, over a network, from a web server. The web server then determines suitable content to respond with, requests supplemental content from a content platform server, combines the supplemental content with the requested content and provides that to the user's browser in response to the request. In making the request for the supplemental content, the web server sends with the request a digital certificate and possibly also information about the user, the requested content and/or the user's request details (e.g., search terms, URL). The content platform server decides, based at least on the digital certificate, and possibly other information, which supplemental content to send to the web server.

As used herein, supplemental content refers to any content that is provided, in addition to the content requested by the user. In some embodiments, the supplemental content can comprise an advertisement, a banner, a ribbon, or any other content. In some embodiments, the supplemental content can be an image, an audio clip, an animation, a video clip, an executable program, or combination thereof, storable in electronic form, such as memory, and presentable (or convertible into content that is presentable) to a user of a client device or system that is also capable of obtaining and/or presenting online content to the user. Typically, a network arrangement involves one or more such client devices or systems, one or more content servers, one or more content platform servers, and possibly also separate structures to combine outputs of content servers and content platform servers.

While embodiments described herein are directed primarily to the distribution of online supplemental content, it should be appreciated that embodiments can also be directed to other types of supplemental content and their distribution. For example, embodiments can relate to the distribution of supplemental contents based on digital certificates via radio, television, mobile devices (e.g., supplemental content in the form of SMS text messages, etc.), or the like.

In a typical operation, a client device makes a request, over the Internet or other network, of a web server (or other content server) for content, and the web server (or other server) responds with the requested content combined with supplemental content that the web server obtained (or obtained reference to) by requesting it from the content platform server.

The term "website" is often used to refer to a web server (or coherent collection of servers) and the content that it serves, reflecting the user experience of "going:" to a virtual place (site) when the user causes a client device to retrieve and display some or all of that content. Therefore, it should be understood that "website" might be shorthand for a collection of network interfaced hardware and content stored or accessible thereon. Typically, but not always, the content and hardware of a website are perceived by viewers as being integrated and under control of a unitary entity, at least in part.

In certain embodiments, a content platform server includes a supplemental content inventory, which stores one or more online supplemental contents. In some embodiments, an individual online supplemental content may be associated with one or more supplemental content classes or categories. For example, a first stored supplemental content may be associated with a general audiences ("G" rated) class. A second stored supplemental content may be associated with a restricted ("R" rated) class. While an individual supplemental content may be associated with more than one class, for simplicity within the present disclosure, individual online supplemental contents will be discussed as being associated with a single supplemental content class.

During operation of the content platform server, the content platform server may receive a request for online supplemental content from a web server. In some embodiments, the received request may include a digital certificate. The digital certificate may have been previously signed by either the operator of the content platform server or by a trusted certificate authority. Upon receiving the request, the content platform server may verify the validity of the certificate. In doing so, the content platform server may determine whether information provided by the certificate is to be trusted. If the digital certificate is valid, the content platform server may thereafter use the certificate to determine one or more supplemental content classes for a website associated with the requesting web server. Based on the determined class or classes, the content platform server may select a supplemental content from its supplemental content inventory. Illustratively, if the content platform server determines that a website is associated with an "R" rated class, the content platform server may only select supplemental contents approved for the "R" rated class. While an individual website may be associated with more than one supplemental content class, for simplicity within the present disclosure, individual websites will be discussed as being associated with a single supplemental content class. After selecting a supplemental content, the content platform server may provide the supplemental content to the requesting web server.

As described herein, the distribution of online supplemental contents based on digital certificates can be performed by appropriate systems. By requiring websites to provide digital certificates when requesting supplemental content, supplemental content providers can more efficiently and effectively manage where their supplemental content appear. In particular, in order for a website to receive certain supplemental content, the website must provide a valid digital certificate. Obtaining a valid digital certificate typically involves a rigorous verification process. Illustratively, a website operator may be required to submit official documentation (e.g., articles of incorporation, etc.) in order to be verified. As a result, embodiments of the present invention enable a supplemental content provider to ensure that those websites displaying its supplemental content are legitimate. Embodiments further prevent website operators from using supplemental contents for unapproved purposes. More specifically, because information in a digital certificate has a cryptographic binding, the information cannot be unilaterally changed by a website operator. For example, a website operator cannot unilaterally modify a digital certificate's classification from an "R" rated class to a "G" rated class. Embodiments further reduce the amount of time and resources supplemental content providers must utilize managing the distribution of supplemental content. In particular, embodiments shift the distribution of supplemental content from an exclusion based model to an inclusion based model. Thus, instead of selecting websites to ban from a distribution network, a supplemental content provider can choose those websites it wishes to include. By moving to such a model and using these structures, supplemental content providers no longer need to continuously monitor for illegitimate or rogue websites to exclude or blacklist.

Examples of the concepts and disclosures provided above will now be further explained with reference to the figures. FIG. 1 illustrates a block diagram of an exemplary supplemental content distribution system 100 according to one embodiment of the present invention.

Supplemental content distribution system 100 includes a supplemental content provider server 102, a supplemental content agency server 104, a content platform server 106—also referred to herein as a supplemental content platform server 106, a web server 108, and a user computing device 112. In the supplemental content distribution system 100, supplemental content provider server 102 is connected to supplemental content agency server 104. Supplemental content agency server 104 is connected to content platform server 106. Content platform server 106 is connected to web server 108, which is connected to user computing device 112 over network 110. Although the supplemental content distribution system 100 of FIG. 1 shows only one supplemental content provider server 102, one supplemental content agency server 104, one content platform server 106, one web server 108, and one user computing device 112, any suitable number of these entities (including zero) may be included. For example, the system may include multiple supplemental content agency servers. As another example, the system might not include any supplemental content agency servers.

As a result, supplemental content provider server 102 may be directly connected to content platform server 106.

In the present embodiment, supplemental content distribution system 100 may also include software that enables communications between the various entities shown in FIG. 1. For example, communications between the entities may be facilitated by the HTTP, SSL, TLS, TCP/IP, RTP/RTSP protocols, and/or the like.

Supplemental content provider server 102 may be implemented as one or more computer systems. For example, supplemental content provider server 102 may be a large mainframe, a minicomputer cluster, or a group of servers functioning as a unit. In some embodiments, supplemental content provider computer 102 may include a computer-readable medium (CRM) and a processor coupled to the CRM.

In some embodiments, the CRM can include, for example, components forming tier 0 storage, components forming tier 1 storage, components forming tier 2 storage, and/or any other tier of storage. In some embodiments, tier 0 storage refers to storage that is the fastest tier of storage in the CRM, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in a memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the CRM can be arranged into one or several storage area networks (SAN), which one or several storage area networks can be one or several dedicated networks that provide access to data storage, and particularly that provide access to consolidated, block level data storage. A SAN typically has its own network of storage devices that are generally not accessible through the local area network (LAN) by other devices. The SAN allows access to these devices in a manner such that these devices appear to be locally attached to the user device.

In some embodiments, supplemental content provider server 102 may transmit online supplemental contents to supplemental content agency server 104. Supplemental content provider server 102 may also transmit online supplemental contents to other supplemental content agency servers. In some embodiments, supplemental content provider server 102 may additionally or alternatively transmit online supplemental contents to content platform server 106. Supplemental content provider server 102 may further transmit data regarding the web sites on which a particular supplemental content or a set of supplemental contents may be displayed. For example, supplemental content provider server 102 may transmit data indicating that supplemental content may only be displayed on children's websites. As another example, supplemental content provider server 102 may transmit data specifying that supplemental content may not be displayed on adult web sites.

Supplemental content agency server 104 may be implemented as one or more computer systems. For example, supplemental content agency server 104 may be a large mainframe, a minicomputer cluster, or a group of servers functioning as a unit. In some embodiments, supplemental content agency server 104 may include a computer-readable medium (CRM) and a processor coupled to the CRM, which CRM can include all or portions of the features of the CRM discussed above. In embodiments of the present invention, supplemental content agency server 104 may transmit online supplemental contents to content platform server 106.

Supplemental content agency server 104 may also transmit online supplemental contents to other content platform servers. In certain embodiments, supplemental content agency server 104 may additionally or alternatively transmit online supplemental contents to other supplemental content agency servers. Supplemental content agency server 104 may further transmit data regarding the websites on which a particular supplemental content or a set of supplemental contents may be displayed.

The content platform server 106 may be implemented as one or more computer systems. For example, content platform server 106 may be a large mainframe, a minicomputer cluster, or a group of servers functioning as a unit. In some embodiments, content platform server 106 may include a computer-readable medium (CRM) and a processor coupled to the CRM, which CRM can include all or portions of the features of the CRM discussed above. In some embodiments, content platform server 106 may be configured to manage and distribute online supplemental content. Content platform server 106, in some embodiments, may deliver online supplemental content through various content delivery channels including traditional online content delivery channels (e.g., websites), mobile phone content delivery channels, video content delivery channels (e.g., streaming video systems), audio content delivery channels (e.g., online radio systems), and/or the like.

In some embodiments, content platform server 106 may be a server of a supplemental content platform service. In some embodiments, content platform server 106 may be configured to receive online supplemental content from one or more supplemental content agency servers and/or supplemental content provider servers, such as supplemental content agency server 104 and supplemental content provider server 102. The content platform server 106 may further be configured to store received online supplemental content in a supplemental content inventory. Content platform server 106 may additionally be configured to receive supplemental content requests from one or more servers, such as web server 108.

In certain embodiments, the requests may include a digital certificate for a website associated with web server 108. The digital certificate may include any suitable information necessary for verifying, identifying, and classifying web server 108 and/or the website associated with web server 108. For example, the digital certificate may include identifiers (e.g., issuer information, certificate identification information), attributes (e.g., certificate number, rating), digital signatures and other types of information. Illustratively, a digital certificate may include a certificate number. The number may have been assigned based on the entity that requested the certificate. For example, a number may be assigned from a specific range of numbers if the requesting entity is a large corporation rather than a small business. Based on an understanding as to the manner in which certificate numbers are assigned, embodiments can appropriately classify an associated website.

In some embodiments, the digital certificate may be formatted and include information as specified by the X.509 standard. The digital certificate may additionally or alternatively include information not specified by the X.509 standard. For example, the digital certificate may include supplemental content classification information, certificate type information, or any other suitable information for classifying a website. In another variation, the digital certificates are those used to authenticate websites for other purposes, such as for securing communications.

In some embodiments, content platform server 106 may validate the digital certificate.

Content platform server 106 may additionally use the information provided in the digital certificate to identify a supplemental content class for a website associated with web server 108. Thereafter, content platform server 106 may select an online supplemental content from its supplemental content inventory based on the class of the website associated with web server 108. For example, content platform 106 may determine that the website associated with web server 108 belongs to an adult level class. As a result, content platform server 106 may only select online supplemental contents that are permitted to be displayed on websites associated with the adult class.

Web server 108 may be implemented as, for example, one or more computer systems. For example, web server 108 may be a large mainframe, a minicomputer cluster, or a group of servers functioning as a unit. In some embodiments, web server 108 may include a computer-readable medium (CRM) and a processor coupled to the CRM. In some embodiments, web server 108 may be an Internet-connected server responsive to requests at a URL designated by the operator of the web server. Web server 108 may further store web pages and other content for a website. In some embodiments, web server 108 may transmit requests for online supplemental contents to content platform server 106. In certain embodiments, an online supplemental content request may include an assigned digital certificate.

User computing device 112 may be any suitable device for accessing a network, such as the Internet. User computing device 112 may be, for example, a computer device, such as a desktop computer, a laptop computer, a tablet device, a mobile phone, a personal digital assistant (PDA), a gaming device, a multimedia device, a handheld device, a multifunction device, a television, a digital video recorder (DVR), and the like. In some embodiments, the user computing device 112 may run a variety of operating systems and/or mobile operating systems, and may be enabled for Internet, e-mail, short message service (SMS), Bluetooth®, mobile radio-frequency identification (M-RFID), and/or other communication protocols.

User computing device 112 may include a computer readable memory (CRM), and a processor coupled to the CRM, which CRM can include all or portions of the features of the CRM discussed above. User computing device 112 may additionally include standard computer components such as a disk drive, CD ROM drive, display (e.g., CRT or LCD monitor), display adapter, network card, wireless card, input device (e.g., a mouse, a keyboard, a touch screen LCD), and other components, subsystems, and devices. In some embodiments, the processor of user computing device 112 may be configured to execute a web browser, such as the Microsoft Internet Explorer™ browser, the Mozilla Firefox™ browser, the Google Chrome™ browser, the Apple Safari™ browser, or the Opera™ browser, etc.

In various embodiments, network 110 may include, among other possibilities, the Internet, a wide area network, a local area network, a virtual private network (VPN), or the like. In some embodiments, user computing device 112 may access network 110 through any of various wired or wireless network adaptors, such as a modem, Ethernet device, and/or hardware using one or more of CDMA, GSM, WiFi, IR, 4G, satellite link, cellular data network adaptors, and/or the like. For simplicity within the present disclosure, the example for network 110 may be the Internet, but it should be understood that it is used interchangeably with other networks in the following discussion.

Figure 1A:
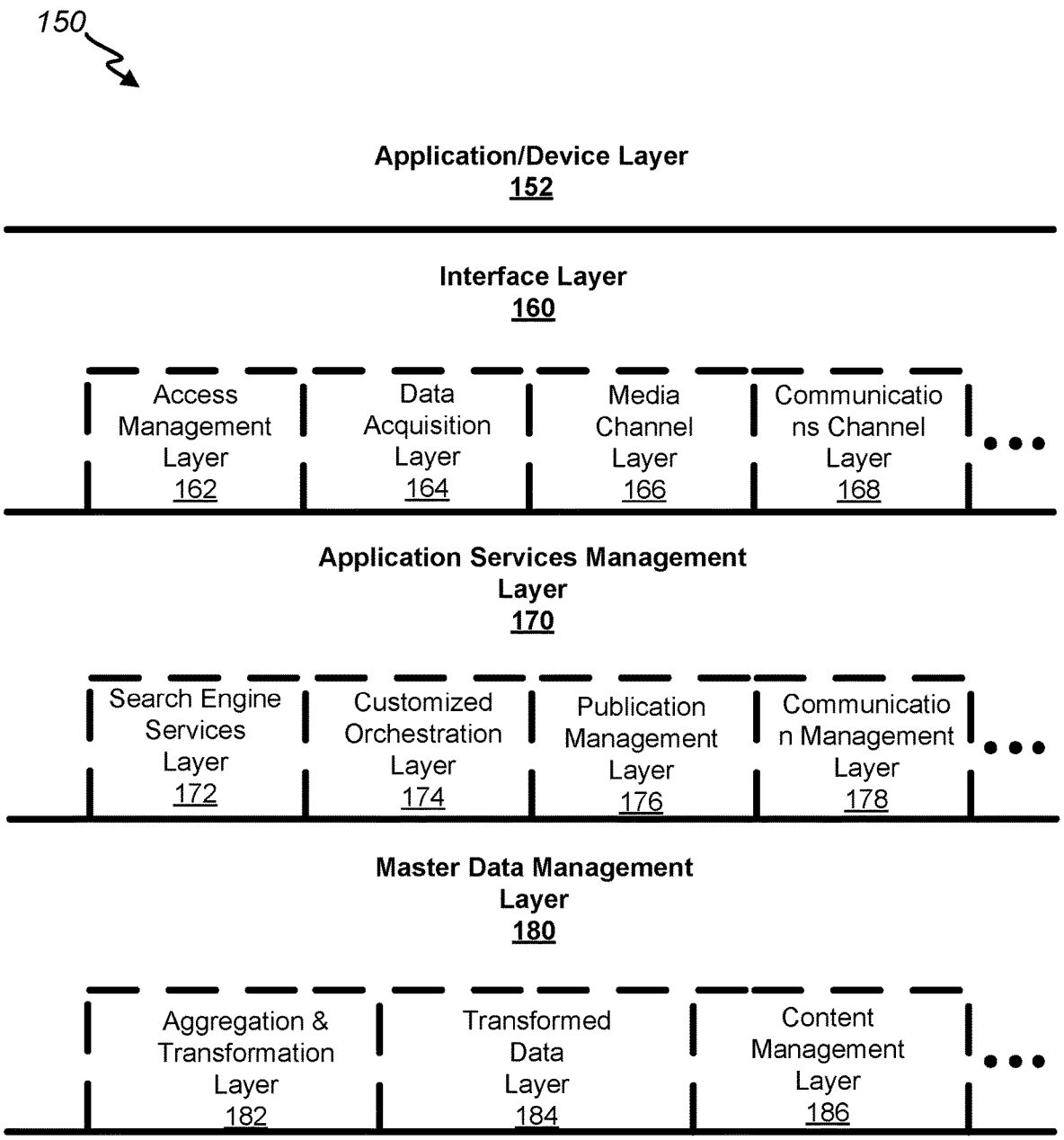
FIG. 1A is a block diagram of an architecture stack of the supplemental content distribution system, in accordance with certain embodiments of the present disclosure, in accordance with certain embodiments of the present disclosure.

FIG. 1A shows a diagram of an architecture stack 150 of the supplemental content distribution system 100 and/or of components of the content distribution system 100 such as, for example, the user computing device 112, in accordance with certain embodiments of the present disclosure. While architecture stack 150 is illustrated as having a particular structure, it should be understood that certain embodiments may include other structures, including those with more or fewer layers than illustrated, in varying orientations and divisions. The architecture stack 150 may be implemented across a plurality of systems and/or subsystems corresponding to the supplemental content distribution system 100. In some embodiments, a multi-layer part of the architecture stack 150 may be implemented at a single system or device within the supplemental content distribution system 100.

The different layers of the architecture stack 150 are described generally herein with reference to FIG. 1A and in detail with reference to subsequent figures. From a high level perspective, the architecture stack 150 may include an application and/or device layer 152, an application services management layer 170, and/or a master data management layer 180. The application and/or device layer 152, the application services management layer 170, and/or the master data management layer 180 may include or otherwise interface with any of various sublayers. In some embodiments, the application and/or device layer 152, the application services management layer 170, and/or the master data management layer 180 may share resources and services with any one or combination of sublayers; and, in some embodiments, certain sublayers may share resources and services with certain other sublayers.

The application/device layer 152 may include user devices and applications for interacting with the other elements of the architecture stack 150 via the elements of an interface layer 160. For example, the applications may include web-based applications, entity portals, mobile applications, widgets, and the like for requesting services from and/or otherwise accessing the supplemental content distribution system 100. These applications may run on one or more user devices. The user devices may be any suitable user device as detailed herein.

The interface layer 160 of the architecture stack 150 may provide interfaces for a user device to interact with the other elements of the architecture stack 150. For example, clients, entities, administrators, and others serviced by and/or otherwise associated with the supplemental content distribution system 100 may utilize one or more user devices interacting within the application/device layer 152 to request services and/or access from an application services management layer 170. In some examples, a web-based search interface, a mobile application search interface, an orchestration platform interface, a provider dashboard interface, and/or the like may be provided.

In various embodiments, the interface layer 160 may include or otherwise interface with any one or combination of an access management layer 162, a data acquisition layer 164, a media channel layer 166, a communications channel layer 168, and/or the like layer in accordance with embodiments disclosed herein.

The architecture stack 150 may include an access management layer 162. The access management layer 162 may include elements to manage access to services and/or data. For example, the access management layer 162 may include elements to verify user login credentials, IP addresses associated with a user device, device IDs, telephone numbers, locations, and/or the like in order to provide certain services and/or access.

The architecture stack 150 may include a data acquisition layer 164. In some embodiments, the data acquisition layer 164 may be included in the application services management layer 170. The data acquisition layer 164 may receive data from various data sources to facilitate various embodiments disclosed herein. The any one or combination of data sources, disclosed herein and/or the like, include aggregation being facilitated in some embodiments with any one or combination of a plurality of servers 102, 104, 106 and/or user computing devices 112.

The architecture stack 150 may include a media channel layer 166. The media channel layer 166 may provide interfaces for the supplemental content distribution system 100 to utilize various media channels. For example, services may be provided to clients, entities, administrators, and others serviced by and/or otherwise associated with the supplemental content distribution system 100 by way of media channels of many various types including websites, mobile applications, social/business network websites, cable and satellite television, telephone systems, video distribution, and print (e.g., newspapers and magazines).

The architecture stack 150 may include a communications channel layer 168. The communications channel layer 168 may provide interfaces for the supplemental content distribution system 100 to centrally manage services based on real-time communications. For example, services may be provided to clients, entities, administrators, and others serviced by and/or otherwise associated with the supplemental content distribution system 100 by way of tracking and/or handling of communications such as telephone calls, video calls, messages, chats, video conferencing, and/or the like in response to content objects presented through the various media channels.

In various embodiments, the application services management layer 170 may include or otherwise interface with any one or combination of a search engine services layer 172, a customized orchestration layer 174, a publication management layer 176, a communications management layer 178, and/or the like layer in accordance with embodiments disclosed herein. In various embodiments, the search engine services layer 172 may include elements to provide effective search services to end users, providers, and/or internal elements and/or users of the supplemental content distribution system 100. In some embodiments, the search services may include geo-aware search services. The geo-aware search services may provide fast and efficient access to information tailored to particular geographies. In various embodiments, the master data management layer 180 may include or otherwise interface with any one or combination of an aggregation and transformation layer 182, a transformed data layer 184, a content management layer 186, and/or the like layer in accordance with embodiments disclosed herein.

Figure 2:
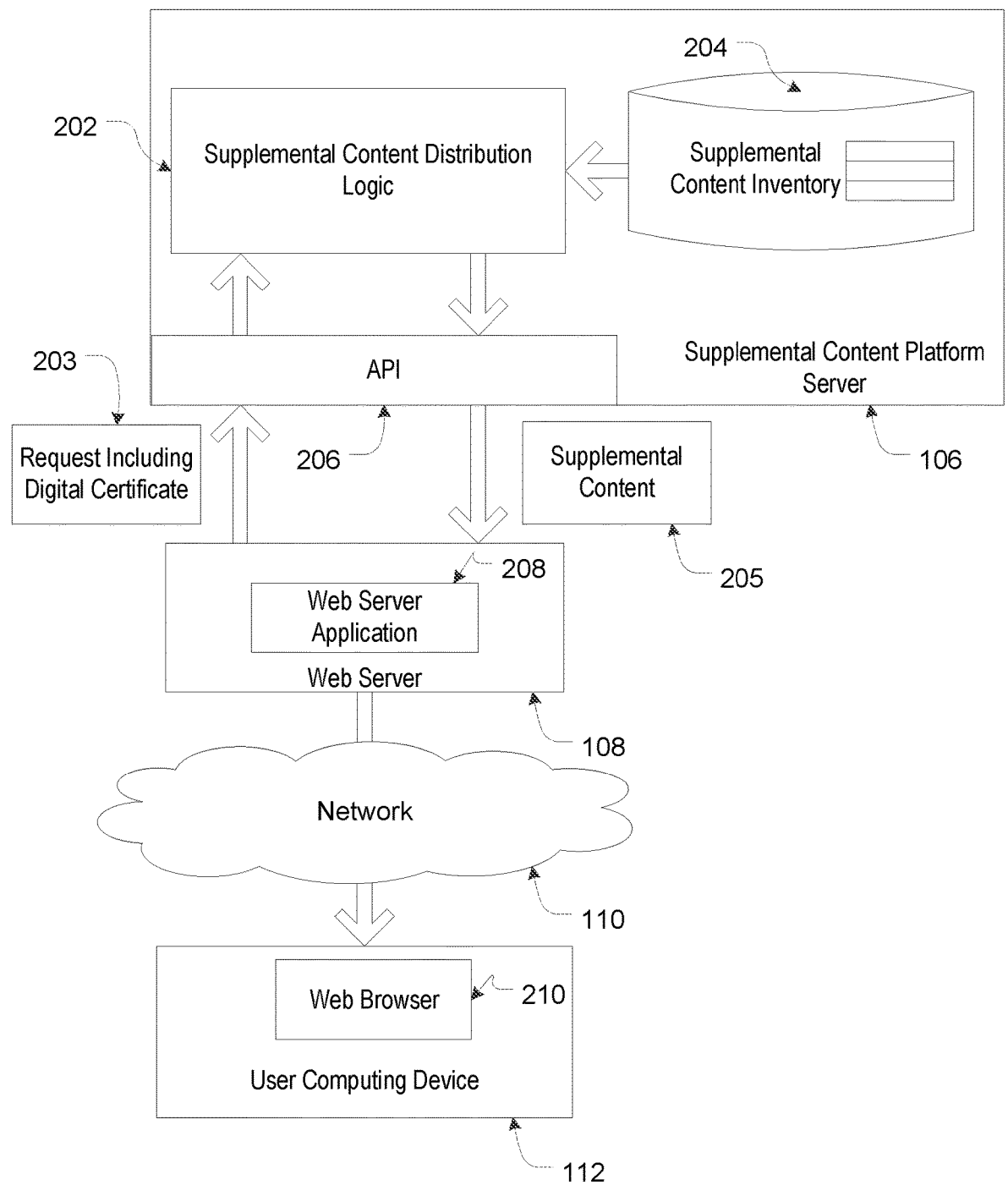
FIG. 2 is a block diagram of a subsystem of the supplemental content distribution system of FIG. 1.

FIG. 2 illustrates a block diagram of an exemplary subsystem 200 of the supplemental content distribution system 100 of FIG. 1 according to one embodiment. FIG. 2 illustrates additional details about the content platform server 106, web server 108, and user computing device 112. In certain embodiments, content platform server 106 may include a supplemental content distribution logic 202, a supplemental content inventory 204, and an application programming interface (API) 206.

Supplemental content distribution logic 202 may be an application program configured to receive, manage, and distribute online supplemental contents. In some embodiments, the supplemental content distribution logic 202 may be configured to receive online supplemental content, and to additionally receive requests for the supplemental content. In certain embodiments, a supplemental content request 203 may include, among other information, a digital certificate 205. Supplemental content distribution logic 202 may, upon receiving a request, validate the digital certificate in order to confirm the information provided by the certificate. Supplemental content distribution logic 202 may further access supplemental content inventory 204 and select an online supplemental content based on an identified supplemental content class.

In some embodiments, supplemental content distribution logic 202 may select an online supplemental content based on additional criteria, such as contractual obligations with associated supplemental content providers, history information, user data, user computing device attributes, contextual information (e.g., keywords, tags), geographic information, localization information, supplemental content dimensions (e.g., height and width in pixels), supplemental content types (e.g., pop-up ad, in-content ad, etc.), supplemental content format information (Adobe Flash™ data, animated GIF, JPEG, etc.), and/or other types of data. For example, supplemental content distribution logic 202 may determine a set of potential online supplemental content based on the determined supplemental content class. After determining the set of potential supplemental content, supplemental content distribution logic 202 may select a supplemental content from the set based on keyword information provided in the supplemental content request.

In some embodiments, supplemental content distribution logic 202 may optimize the processing of a request. For example, supplemental content distribution logic 202 may utilize a caching scheme to improve performance. Supplemental content distribution logic 202 may also optimize the amount of times a website's digital certificate must be revalidated over a given time period.

Supplemental content inventory 204 may be implemented as data stored in one or more electronic storage units (e.g., standalone hard drives) capable of storing electronic data. In some embodiments, supplemental content inventory 204 may include one or more pieces of online supplemental content. In certain embodiments, the pieces of online supplemental content may be received from supplemental content agency servers and/or supplemental content provider servers, such as supplemental content agency server 104 and supplemental content provider server 102. Pieces of online supplemental content may be implemented in any suitable form.

For example, an online supplemental content may be a static image (e.g., JPGs), an animated image (e.g., animated GIFs), an Adobe Flash™ based program, a Java based program, a Microsoft Silverlight™ based program, a piece of audiovisual media, a piece of audio-only media, an interactive computer program, and/or the like. For example, an online supplemental content may be a video file providing information regarding a special-offer for a Blu-ray™ disc for the Toy Story 3™ movie.

Application programming interface 206 may be a software interface that facilitates communications between supplemental content distribution logic 204 and web server 108. The application programming interface 206 may include suitable specifications for communication protocols, routines, and data structures. For example, application programming interface 206 may define the manner in which supplemental content requests are to be communicated and/or the manner in which online supplemental contents are to be distributed.

In certain embodiments, web server 108 may include a web server application 208. Web server application 208 may be an application program configured to receive web page requests from user computing devices and to transmit web pages, including online supplemental contents, in response to the web page requests. Web server application 208 may be any suitable software that implements the HTTP protocol, such as a Microsoft IIS™ server, Apache Web Server™, an Oracle iPlanet™ system, etc. In some embodiments, web server application 208 may be configured to request online supplemental content from content platform server 106.

In certain embodiments, user computing device 112 may include a web browser 210. Web browser 210 might be executed by a processor of user computing device 112. Web browser 210 may be configured to generate and transmit web page requests. Web browser 210 may additionally be configured to render web pages including online supplemental content received from web server 108. For example, web browser 210 may be configured to render web pages coded in HTML, extensible markup language (XML), JavaScript, etc. so that it is viewable by a user of user computing device 112. Web browser 210 may additionally include plug-ins to render certain types of web content, such as Adobe Flash™ programs, Microsoft Silverlight™ programs, Java programs, and/or the like.

Figure 3:
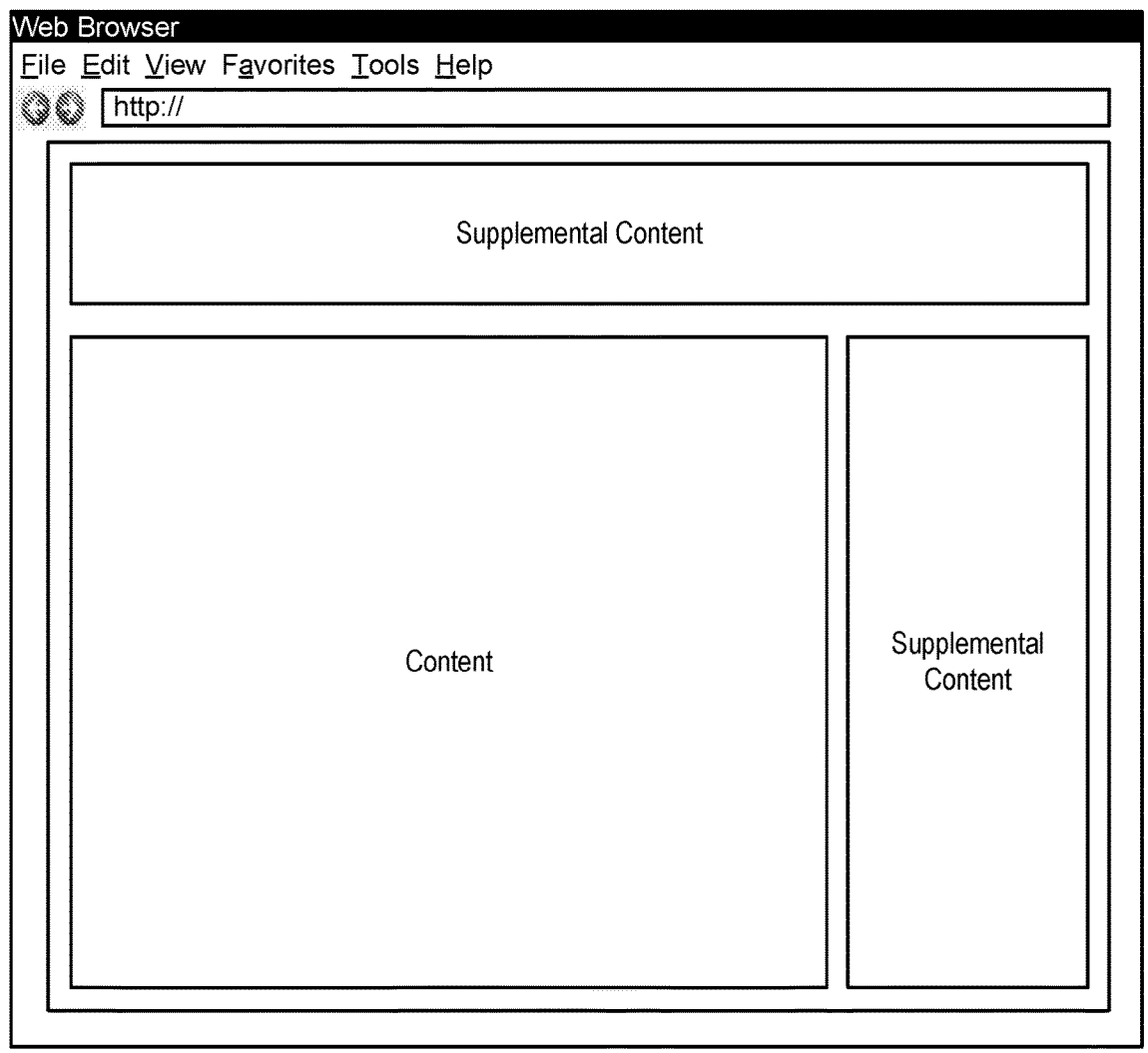
FIG. 3 is an exemplary web page showing example placement locations of online supplemental content according to one embodiment of the present invention.

FIG. 3 illustrates an exemplary web page 300, which illustrates common placement locations of online supplemental contents. The designated supplemental content locations may include one or more pieces of supplemental content. Each supplemental content location may represent a space that web server application 208 may fill with a piece of online supplemental content received from content platform server 106. In some embodiments, each time web page 300 is accessed, web server application 208 may send a new supplemental content request to content platform server 106. As a result, the supplemental content on web page 300 may change each time the page is accessed or refreshed.

While embodiments described herein are directed to supplemental content presented via web pages, it should be appreciated that one of ordinary skill in the art could modify the invention to be directed to non-web page contexts. Other contexts may include, for example, computer games, computer programs, Internet television, Internet radio, text messages, multimedia messages, and/or the like. For instance, embodiments of the present invention may be modified, without departing from the spirit and scope of the invention, to enable a computer game server to request supplemental content from a content platform server and to place the supplemental content in an online computer game. As another example, embodiments of the invention may be modified, without departing from the spirit and scope of the invention, to enable an Internet television server to request supplemental content from a content platform server and to overlay the supplemental content over online video content.

Furthermore, while embodiments described herein are directed to the distribution of supplemental content based on digital certificates, it should be appreciated that one of ordinary skill in the art could modify the invention to be directed to the distribution of supplemental content based on other cryptographic and non-cryptographic based authentication mechanisms.

Examples of processes that may be used to distribute online supplemental content based on digital certificates will now be described.

Figure 4:
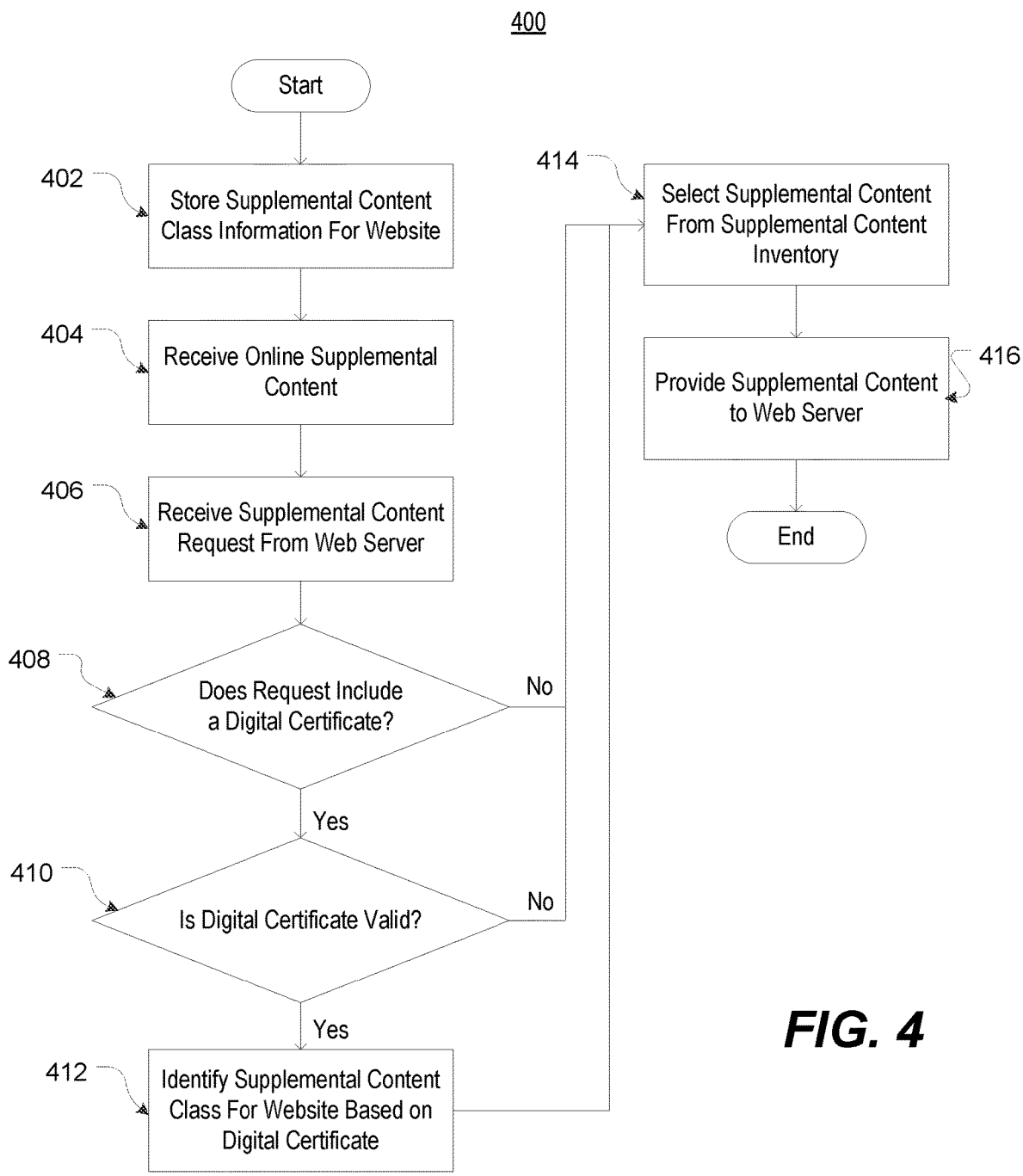
FIG. 4 is a flow diagram of a process for distributing an online supplemental content to a web server based on a digital certificate according to an embodiment of the present invention.

FIG. 4 is a flow diagram of a process 400 for distributing online supplemental content to a web server based on a digital certificate according to an embodiment of the present invention. Process 400 may be performed by e.g., content platform server 106 of FIG. 1.

At step 402, content platform server 106 stores supplemental content class information for a website associated with web server 108. The supplemental content class information may be stored in any suitable manner. For example, the information may be stored in a database or a look-up table of content platform server 106. In some embodiments, content platform server 106 may store the supplemental content class information based on a website identifier. For example, content platform server 106 may store supplemental content class information based on a website common name, domain name, IP address, and/or the like.

In some embodiments, content platform server 106 may have received the supplemental content class information from supplemental content provider server 102 and/or supplemental content agency server 104. In other embodiments, content platform server 106 may have received the supplemental content class information from a certificate authority, such as VeriSign, Inc. In still other embodiments, the supplemental content class information may have been directly inputted into content platform server 106 by the operators of the content platform server. For example, the operators of content platform server 106 may have obtained information regarding a website associated with web server 108 from the website's operators.

Based on the information, the operators of content platform server 106 may determine a class for the website and thereafter provide class information for the website to content platform server 106.

In certain embodiments, content platform server 106 may not store supplemental content class information for the website associated with web server 108. In such embodiments, supplemental content class information may be included in the supplemental content requests received from web server 108.

At step 404, content platform server 106 may receive online supplemental content from supplemental content provider server 102 and/or supplemental content agency server 104. The online supplemental content may be any suitable type of supplemental content. For example, online supplemental content may be a banner ad, skyscraper ad, pop-up ad, or in-content ad. The online supplemental content may additionally be implemented in any suitable form. For example, an online supplemental content may be a static image (e.g., JPGs), an animated image (e.g., animated GIFs), an Adobe Flash™ based program, a Java based program, a Microsoft Silverlight™ based program, a piece of audiovisual media, a piece of audio-only media, an interactive computer program, and/or the like. In some embodiments, the received online supplemental content may be stored in supplemental content inventory 204.

In certain embodiments, content platform server 106 may additionally receive supplemental content class information and/or other metadata for the received online supplemental content. The supplemental content class information and/or other metadata may be received from supplemental content provider server 102 and/or supplemental content agency server 104. The supplemental content class information and/or other metadata may be received prior to, concurrently with, or following the receipt of the online supplemental content.

In some embodiments, the supplemental content class information may indicate the websites on which a supplemental content or a set of supplemental contents may be presented. For example, content platform server 106 may receive supplemental content class information for a particular online supplemental content at the same time (or substantially the same time) as receipt of the supplemental content. The supplemental content class information may indicate that the particular supplemental content is to be presented only on websites associated with a general audiences class (e.g., "G" rated). As another example, content platform server 106 may receive supplemental content class information prior to the receipt of an online supplemental content. The supplemental content class information may indicate that all supplemental contents associated with a particular entity (e.g., a supplemental content provider company, a supplemental content agency, etc.) are to be excluded from presentation on websites associated with a restricted class (e.g., "R" rated). As a result, even if a website operator had an incentive to request inappropriate supplemental content based on the website's content, perhaps in an effort to increase compensation to the website operator without considering the appropriateness, it would not occur, since content platform server 106 checks certificates and can limit supplemental content provided and paid for, based on the certificates.

In some embodiments, the supplemental content class information may include criteria information for digital certificates. For example, the metadata can indicate that a particular supplemental content may only be presented on a website that has provided a digital certificate of a particular type, issued by a particular certificate authority; included a particular attribute; etc.

The supplemental content class information and/or other metadata received by content platform server 106 may be stored in any suitable manner. For instance, the supplemental content class information may be stored in a database or a look-up table of content platform server 106.

In some embodiments, content platform server 106 may further receive additional information (e.g., metadata) useful in the selection of an online supplemental content. For example, content platform server 106 may receive contextual information (e.g., keywords, tags), geographic information, localization information, supplemental content dimensions (e.g., height and width in pixels), supplemental content type information (e.g., pop-up ad, in-content ad, etc.), supplemental content format information (Adobe Flash™ programs, animated GIF, JPEG, etc.), and/or other types of data.

At step 406, supplemental distribution logic 202 of content platform server 106 receives a request for one or more pieces of online supplemental content from web server 108. In some embodiments, web server 108 may transmit the supplemental content request as part of the processing of a web page request from user computing device 112. In certain embodiments, the request may be formatted according to the specifications of application programming interface 206. For example, the request may be formatted in extensible markup language (XML). In some embodiments, the request may be securely received. For example, the request may be received over a TLS or SSL connection.

At decision 408, supplemental distribution logic 202 determines if the received request includes a digital certificate. In some embodiments, a digital certificate may be issued to the operators of the website associated with web server 108 by the operators of content platform server 106 or by a trusted certificate authority, such as VeriSign, Inc. In embodiments of the present invention, the digital certificate may include any suitable information for verifying the identity of and determining the supplemental content class for a website associated with web server 108. For example, the digital certificate may include version information, a serial number, an algorithm identifier, issuer information, validity information, subject information, subject public key information, extension data, certificate signature algorithm information, and/or a certificate signature. In certain embodiments, the digital certificate may be formatted to and include information as specified by the X.509 standard. In some embodiments, the digital certificate may alternatively or additionally include information not specified by the X.509 standard. For example, the digital certificate may include supplemental content class information and/or certificate type information.

In certain embodiments, a supplemental content request may further include information useful in selecting a piece of online supplemental content. For example, a request may include user data, user computing device attributes, contextual information (e.g., keywords, tags), geographic information, localization information, supplemental content dimensions (e.g., height and width in pixels), supplemental content types (e.g., pop-up ad, in-content ad, etc.), supplemental content format information (Adobe Flash™ program, animated GIF, JPEG, etc.), and/or other types of data. Illustratively, a web page requested by user computing device 112 may discuss a recent World Series game. As a result, the supplemental content request transmitted by web server 108 may indicate that a supplemental content related to baseball is preferable.

At decision 410, supplemental distribution logic 202 determines the validity of the digital certificate received from web server 108. For example, supplemental distribution logic 202 may determine whether the digital certificate is authentic and whether or not it has been revoked.

In some embodiments, supplemental distribution logic 202 may determine the authenticity of the digital certificate by retrieving a public key for the issuer (e.g., issuing certificate authority) of the received digital certificate. The issuer's public key may be retrieved from any suitable source. For example, the issuer's public key may be retrieved from a publicly accessible server over the Internet. As another example, the issuer's public key may be stored locally at content platform server 106. Upon retrieving the public key, supplemental distribution logic 202 may use the public key to verify a digital signature included in the received digital certificate. Based on the result of the signature verification, supplemental distribution logic 202 may determine whether the digital certificate is authentic.

In some embodiments, supplemental distribution logic 202 may determine whether a digital certificate has been previously revoked by accessing a revocation list. The revocation list may be associated with the issuer (e.g., certificate authority) of the digital certificate. In certain embodiments, the revocation list may include a set of serial numbers associated with revoked digital certificates. Supplemental distribution logic 202 may search the revocation list for a serial number matching the serial number of the digital certificate received from web server 108.

In some embodiments, a revocation list may be stored locally at content platform server 106. In other embodiments, the revocation list may be stored on a public server accessible over a network, such as the Internet.

At step 412, supplemental distribution logic 202 determines a supplemental content class for the website associated with web server 108. Supplemental distribution logic 202 may perform such a determination based on information provided by the digital certificate received from web server 108.

In certain embodiments, the digital certificate may include information specifying a class for the website associated with web server 108. For example, the digital certificate may include an attribute specifying that the website associated with web server 108 is associated with an "R" rated class.

In other embodiments, supplemental distribution logic 202 may determine the class for the website associated with web server 108 by searching a database or a look-up table for a record matching an identifier or certificate type included in web server 108's supplemental content request. Illustratively, supplemental distribution logic 202 may search for a record based on a website common name included in the digital certificate received from web server 108. If a match is located, supplemental distribution logic 202 may retrieve the matching record.

In certain embodiments, a matching database or look-up table record may include supplemental content class information. The supplemental content class information may include any suitable supplemental content class identifiers. For example, an identifier may be numerical (e.g., 1, 2), alphanumeric (1A, ABCD, "G," "PG-13"), descriptive (parental guidance required, all ages, general audiences, Pixar™, Disney™), and/or the like.

Supplemental content classes may be organized in any suitable class structure. In some embodiments, supplemental content classes may be organized in a binary structure (e.g., a website is either approved for supplemental contents or not). In other embodiments, supplemental content classes may be organized in a structure that includes several different classes. For example, a structure may include multiple classes formatted in a manner similar to the Motion Picture Association of America (MPAA)'s movie ratings system. Illustratively, an adult website may be classified as NC-17. Likewise, a website geared for a general audience may be classified as G. As another example, a structure may include several different classes, where each class is associated with a specific entity type or name. Illustratively, a website may be associated with a Disney™ supplemental content class. As such, the website may be permitted to present online supplemental contents for The Walt Disney Company and its affiliated companies.

At step 414, supplemental distribution logic 202 selects a piece of online supplemental content to transmit to web server 108. In some embodiments, if a request does not include a valid digital certificate (e.g., a certificate was not included in the request or the digital certificate is not authenticated), supplemental distribution logic 202 may select a supplemental content from a set of pieces of default supplemental content. The set of pieces of default supplemental content may include supplemental contents that have no restrictions as to where they may be presented or are flagged as not requiring a digital certificate to be included with a received online supplemental content request.

If a request includes a valid digital certificate, supplemental distribution logic 202 may select supplemental content based on the supplemental content class determined at step 412. In some embodiments, supplemental distribution logic 202 may determine, based on the determined supplemental content class, an initial set of candidate pieces of supplemental content from the supplemental content inventory 204. Illustratively, in order to determine the initial set of candidate supplemental contents, supplemental distribution logic 202 may filter out any supplemental contents not approved for the determined supplemental content class. After determining the set of candidate online supplemental contents, supplemental distribution logic 202 may select a piece of supplemental content based on any suitable distribution rules, criteria, parameters, and/or the like. Illustratively, supplemental distribution logic 202 may, in selecting supplemental content, consider contractual obligations with associated supplemental content providers, history information, user data, user computing device attributes, contextual information (e.g., keywords, tags), geographic information, localization information, supplemental content dimensions (e.g., height and width in pixels), supplemental content types (e.g., pop-up ad, in-content ad, etc.), supplemental content format information (Adobe Flash™ animated GIF, JPEG, etc.), and/or other types of data. For example, supplemental distribution logic 202 may select a particular online supplemental content based on the number of times the supplemental content has been presented over the past week. As another example, the supplemental content request from web server 108 may indicate a preference for an Adobe Flash™ based banner supplemental content. The supplemental content request may further indicate that the website associated with web server 108 is associated with a sports keyword.

Based on this information, supplemental content distribution logic 202 may select an Adobe Flash™ based banner supplemental content for a Super Bowl™ DVD collection set.

At step 416, supplemental distribution logic 202 provides the selected online supplemental content to web server 108. The online supplemental content may be transmitted to web server 108 in any suitable manner. For example, the online supplemental content may be encapsulated in a response message structured according to the specifications of the application programming interface 206. In other embodiments, supplemental distribution logic 202 may provide a link or location reference to web server 108. In some embodiments, the online supplemental content may be securely provided to web server 108. For example, the online supplemental content may be provided over a TLS or SSL connection.

It should be appreciated that the specific steps illustrated in FIG. 4 provide a particular method for distributing online supplemental contents. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
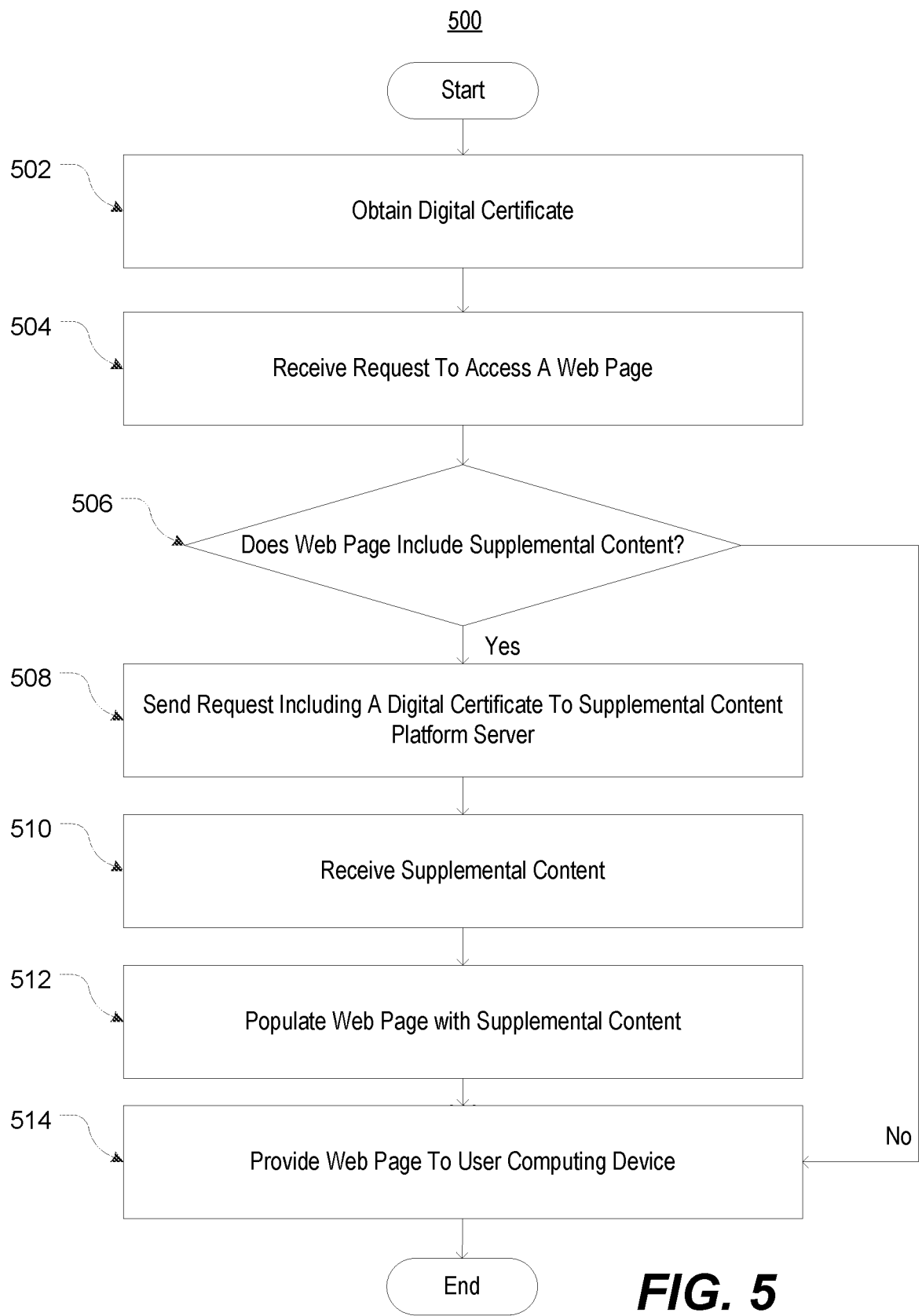
FIG. 5 is a flow diagram of a process for requesting and receiving online supplemental content according to an embodiment of the present invention.

FIG. 5 is a flow diagram of a process 500 for requesting and receiving online supplemental contents from a content platform server according to an embodiment of the present invention. Process 500 may be performed by e.g., web server 108 of FIG. 1.

At step 502, web server 108 obtains a digital certificate for use with content platform server 106. In some embodiments, the digital certificate may be obtained directly from the operators of content platform server 106. In other embodiments, the digital certificate may be obtained from a certificate authority, such as VeriSign, Inc. For example, the operator of a website associated with web server 108 may send a request to a certificate authority for a digital certificate. The request may include documentation or other information confirming the identity of the operator of the website associated with web server 108. Upon receiving the request, the certificate authority may verify the identity and information of the operator of the website associated with web server 108. After verifying the identity of the operator of the website associated with web server 108, the certificate authority generates a digital certificate containing a digital signature signed by the certificate authority. The certificate authority may thereafter send the digital certificate to the operator of the website associated with web server 108, who in turn may provide the digital certificate to web server 108.

The digital certificate may include any suitable information for verifying the identity of and determining the supplemental content class for the website associated with web server 108. For example, the digital certificate may include version information, a serial number, an algorithm identifier, issuer information, validity information, subject information, subject public key information, extension data, certificate signature algorithm information, and/or a certificate signature. In certain embodiments, the digital certificate may be formatted according to and include information as specified by the X.509 standard. In some embodiments, the digital certificate may alternatively or additionally include information not specified by the X.509 standard. For example, the digital certificate may include supplemental content class information and/or certificate type information.

At step 504, web server application 208 of web server 108 receives a request to access a web page from user computing device 112. For example, web server application 208 may serve content (e.g., web pages) over the Internet. During operation, web server application 208 may receive a request for a stored web page from user computing device 112. The request may have been prompted by some action of a user operating user computing device 112. For instance, the user may have entered a URL address into the address bar of web browser 210 of user computing device 112. In responding to the request, web server application 208 may begin preparing the requested web page. For example, if the web page includes any scripts (e.g., PHP code, ASP code, etc.), web server application 208 may process and execute the scripts.

At decision 506, as part of the preparation of the requested web page, web server application 208 may determine whether the web page includes sections or locations reserved for online supplemental contents. For example, a requested web page may include a section reserved for a banner supplemental content.

At step 508, web server application 208 transmits a supplemental content request to content platform server 106. In some embodiments, a single supplemental content request may request multiple online supplemental contents. In some embodiments, the request may be formatted according to and include information as specified by application programming interface 206. In some embodiments, the request may be securely transmitted. For example, the request may be received over a TLS or SSL connection.

In certain embodiments, the request may include the digital certificate obtained from the operators of content platform server 106 or the certificate authority at step 502. The digital certificate may include any suitable information for verifying the identity and determining the supplemental content class for the website associated with web server 108. The request may also include user data, user computing device attributes, contextual information (e.g., keywords, tags), geographic information, localization information, supplemental content dimensions (e.g., height and width in pixels), supplemental content types (e.g., pop-up, in-content, etc.), supplemental content format information (Adobe Flash™ program, animated GIF, JPEG, etc.), and/or other types of data. Illustratively, a web page requested by user computing device 112 may discuss the movie UP™. As such, the supplemental content request transmitted by web server application 208 may indicate that a supplemental content related to a Pixar™ movie is preferable.

At step 510, web server application 208 receives an online supplemental content from content platform server 106. In some embodiments, web server application 208 may alternatively receive a link or location reference to the online supplemental content from content platform server 106.

In some embodiments, the online supplemental content may have been selected based on the digital certificate provided by web server application 208 at step 508. For example, the digital certificate included in the request may have indicated that the web server 108 is associated with a website classified as "R" rated. Accordingly, the supplemental content received from content platform server 106 may be approved for presentation on websites classified as rated "R."

At step 512, web server application 208 may populate a location reserved for the received supplemental content on the requested web page. For example, web server application 208 may place the supplemental content in a supplemental content location positioned at the top of the requested web page. Web server application 208 may further perform additional processing until the requested web page is determined to be ready for transmission to user computing device 112. For example, web server application 208 may request additional supplemental contents, etc.

At step 514, web server application 208 may provide the requested web page to user computing device 112. Upon receiving the web page, web browser 210 of user computing device 112 may render the web page so that the page, including any supplemental contents, is viewable by a user. For example, web browser 210 may display an online supplemental content in a position specified by the HTML code of the requested web page.

In some embodiments, the web page transmission from web server application 208 may include the online supplemental contents for the requested web page. In certain embodiments, the transmission may additionally or alternatively include links or location references indicating where the online supplemental contents for the requested web page may be accessed. For example, a transmission may indicate that an online supplemental content may be accessed directly from content platform server 106.

It should be appreciated that the specific steps illustrated in FIG. 5 provide a particular method for requesting online supplemental contents. Other sequences of steps may also be performed according to alternative embodiments. For example, alternative embodiments of the present invention may perform the steps outlined above in a different order. Moreover, the individual steps illustrated FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Although specific embodiments of the invention have been described, various modifications, alterations, alternative constructions, and equivalents are also encompassed within the scope of the invention. For example, the described invention is not restricted to operation with certain types of supplemental content provider, supplemental content agency, web and content platform servers, but is free to operate with a plurality of different supplemental content providers, supplemental content agencies, or web and/or content platform servers. Additionally, although the present invention has been described using a particular series of transactions and steps, it should be apparent to those skilled in the art that the scope of the present invention is not limited to the described series of transactions and steps. For example, where an element is shown as hardware performing particular actions, it might be replaced with a general purpose processor executing program instructors stored as software with the instructions corresponding to similar actions. The storage can be a computer-readable medium.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

Any of the elements in FIGS. 1 and 2, including any servers or databases, may use any suitable number of subsystems to facilitate the functions described herein.

Figure 6:
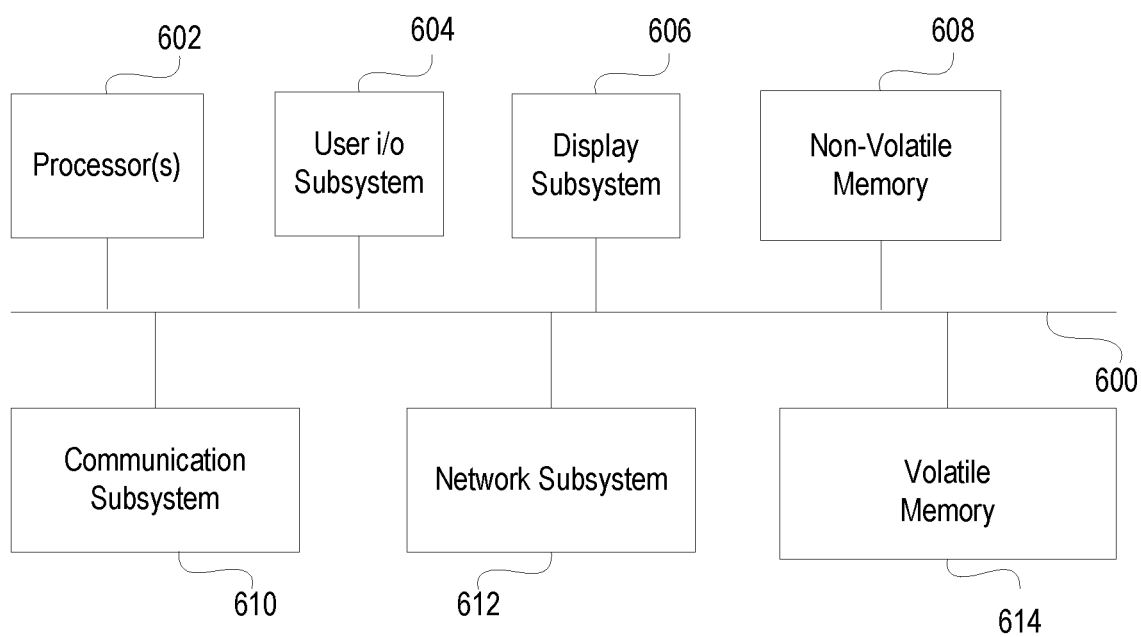
FIG. 6 is a block diagram of exemplary subsystems or components according to one embodiment of the present invention.

Examples of such subsystems or components are shown in FIG. 6. The subsystems shown in FIG. 6 are interconnected via a system bus 600. Additional subsystems such as a processor 602, user I/O subsystem 604, display subsystem 606, non-volatile memory 608, communication subsystem 610, network subsystem 612, volatile memory 614, and others are shown. Peripherals and input/output (I/O) devices, which couple to user I/O subsystem 604 (which may be a processor or other suitable controller), may be connected to the computer system by any number of means known in the art, such as a USB port. Communication subsystem 610 or network subsystem 612 may be used to connect the computer system to a wide area network such as the Internet, a networked resource, a mouse input device, a scanner device, a printing device, and/or the like. The interconnection via system bus allows processor 602 to communicate with each subsystem and to control the execution of instructions from non-volatile memory 608 or volatile memory 614, as well as the exchange of information between subsystems. Non-volatile memory 608 and/or volatile memory 614 may embody a computer readable medium.

What is claimed is:

1. A method for distributing supplemental content over a network to which computing devices are configured to connect, comprising:
   receiving a first supplemental content request including a first digital certificate from a first requestor via a communication subsystem connected to an application programming interface of a supplemental content platform server via a web server, wherein the first requestor comprises a computing device configured to present content and supplemental content to viewers;
   identifying, by the supplemental content platform server, the first digital certificate in the first supplemental content request;
   determining, by the supplemental content platform server, that the first requestor is a legitimate requestor by validating the first digital certificate;
   determining a first supplemental content class from a set of supplemental content classes based on the first digital certificate, wherein each supplemental content class of the set of supplemental content classes is associated with a plurality of requestors, and wherein the first requestor is associated with the first supplemental content class;
   selecting, with the supplemental content platform server, first supplemental content based on: the first supplemental content class; inclusion of the first digital certificate in the first supplemental content request; and a legitimacy of the first requestor, wherein the first supplemental content is preapproved for the first supplemental content class, and wherein the first supplemental content is preapproved for legitimate requestors;
   retrieving the first supplemental content from a data storage device;
   providing the first supplemental content in an electronic form to the first requestor via the application programming interface;
   receiving a second supplemental content request excluding a second digital certificate from a second requestor via the application programming interface of the supplemental content platform server, wherein the second requestor comprises a second computing device that presents content and supplemental content to viewers;
   determining an absence of the second digital certificate in the second supplemental content request;
   selecting, by supplemental content platform server, second supplemental content based on the absence of the second digital certificate in the second supplemental content request, wherein the second supplemental content is selected from a set of default supplemental content, wherein the set of default supplemental content is unrestricted, wherein the unrestricted set of default supplemental content has no restrictions as to inclusion in a supplemental content request, and wherein supplemental content in the unrestricted set of default supplemental content is flagged as not requiring a digital certificate to be included in the supplemental content request;
   providing the second supplemental content in an electronic form to the second requestor.

2. The method of claim 1, further comprising:
   receiving a third supplemental content request including a third digital certificate from a third requestor via the application programming interface of the supplemental content platform server, wherein the third requestor comprises a third computing device that presents content and supplemental content to viewers;

determining that the third digital certificate in the third supplemental content request is invalid;

selecting, by the supplemental content platform server, third supplemental content based on the determined invalidity of the third digital certificate in the third supplemental content request, wherein the third supplemental content is selected from the set of default supplemental content; and providing the third supplemental content in an electronic form to the third requestor.

3. The method of claim 1, further comprising receiving metadata associated with at least one of the first supplemental content or the second supplemental content.

4. The method of claim 3, wherein selecting the first supplemental content or the second supplemental content is further based on the metadata.

5. The method of claim 3, wherein the metadata includes supplemental content class information.

6. The method of claim 1, further comprising receiving supplemental content data from a supplemental content provider server, wherein the supplemental content data includes at least one piece of supplemental content and metadata associated with the at least one piece of supplemental content; and wherein selecting the first supplemental content or the second supplemental content is further based on the metadata associated with the at least one piece of supplemental content.

7. The method of claim 6, wherein the supplemental content provider server is associated with a supplemental content provider.

8. The method of claim 6, wherein the metadata includes digital certificate criteria information.

9. The method of claim 1, wherein determining the first supplemental content class comprises:

determining a certificate type for the first digital certificate; and identifying the first supplemental content class based on the certificate type.

10. The method of claim 1, wherein determining the first supplemental content class includes identifying the first supplemental content class based on classification information provided by the first digital certificate.

11. The method of claim 1, wherein at least one supplemental content class in the set of supplemental content classes is based on a Motion Picture Association of America movies ratings system.

12. The method of claim 1, wherein selecting the first supplemental content is further based on information about a website with which the first digital certificate is associated.

13. The method of claim 1, wherein the first digital certificate is formatted according to an X.509 standard.

14. A system for authenticated supplemental content delivery comprising:

a first requestor comprising a first computing device configured to present content and supplemental content to viewers;

a second requestor comprising a second computing device configured to present content and supplemental content to viewers;

at least one server configured to:

receive a first supplemental content request including a first digital certificate from the first requestor;

determine an inclusion of the first digital certificate in the first supplemental content request;

validate the first digital certificate to determine that the first requestor is a legitimate requestor;

determine a first supplemental content class from a set of supplemental content classes based on the first digital certificate, wherein each supplemental content class of the set of supplemental content classes is associated with a plurality of requestors, and wherein the first requestor is associated with the first supplemental content class;

select first supplemental content based on: the first supplemental content class; the inclusion of the first digital certificate in the first supplemental content request;

and a legitimacy of the first requestor, wherein the first supplemental content is preapproved for the first supplemental content class, and wherein the first supplemental content is preapproved for legitimate requestors;

provide the first supplemental content in an electronic form to the first requestor;

receive a second supplemental content request excluding a second digital certificate from the second requestor;

determine an absence of the second digital certificate in the second supplemental content request;

select second supplemental content based on the absence of the second digital certificate in the second supplemental content request, wherein the second supplemental content is selected from a set of default supplemental content, wherein the default supplemental content is unrestricted, wherein the unrestricted set of default supplemental content has no restrictions as to inclusion in a supplemental content request, and wherein supplemental content in the unrestricted set of default supplemental content is flagged as not requiring a digital certificate to be included in the supplemental content request; and provide the second supplemental content in an electronic form to the second requestor.

15. The system of claim 14, wherein the at least one server is further configured to:

receive a third supplemental content request including a third digital certificate from a third requestor, the third requestor comprising a third computing device configured to present content and supplemental content to viewers;

determine an invalidity of the third digital certificate in the third supplemental content request;

select third supplemental content based on the invalidity of the third digital certificate in the third supplemental content request, wherein the third supplemental content is selected from the set of default supplemental content; and provide the third supplemental content in an electronic form to the third requestor.

16. The system of claim 14, wherein the at least one server is further configured to receive metadata associated with at least one of the first supplemental content or the second supplemental content.

17. The system of claim 16, wherein selecting the first supplemental content or the second supplement content is further based on the metadata.

18. The system of claim 16, wherein the metadata includes supplemental content class information.

19. The system of claim 14, wherein the at least one server is further configured to receive supplemental content data from a supplemental content provider server, wherein the supplemental content data includes at least one piece of supplemental content and metadata associated with the at least one piece of supplemental content; and wherein selecting the first supplemental content or the second supplemental content is further based on the metadata associated with the at least one piece of supplemental content.

20. The system of claim 19, wherein the supplemental content provider server is associated with a supplemental content provider.

21. The system of claim 19, wherein the metadata includes digital certificate criteria information.

22. The system of claim 14, wherein determining the first supplemental content class comprises:

determining a certificate type for the first digital certificate; and identifying the first supplemental content class based on the certificate type.

23. The system of claim 14, wherein determining the first supplemental content class includes identifying the first supplemental content class based on classification information provided by the first digital certificate.

24. The system of claim 14, wherein at least one supplemental content class in the set of supplemental content classes is based on a Motion Picture Association of America movies ratings system.

25. The system of claim 14, wherein selecting the first supplemental content is further based on information about a website with which the first digital certificate is associated.

26. The system of claim 14, wherein the first digital certificate is formatted according to an X.509 standard.

\* \* \* \* \*